Sept. 4, 1923.
M. J. LANDERS
RELIEF VALVE ATTACHMENT FOR FAUCETS
Filed June 23, 1921
1,467,004
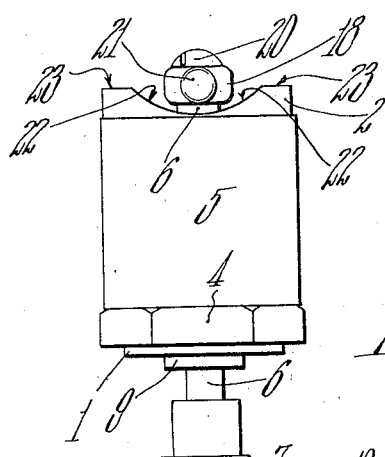
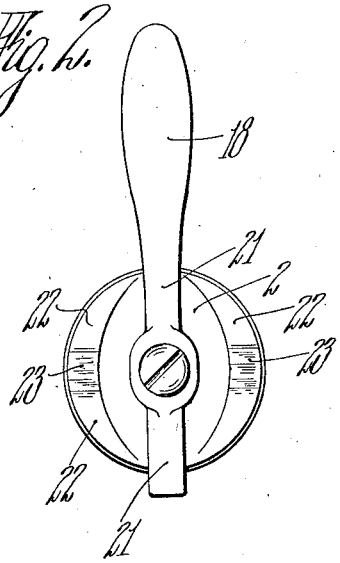
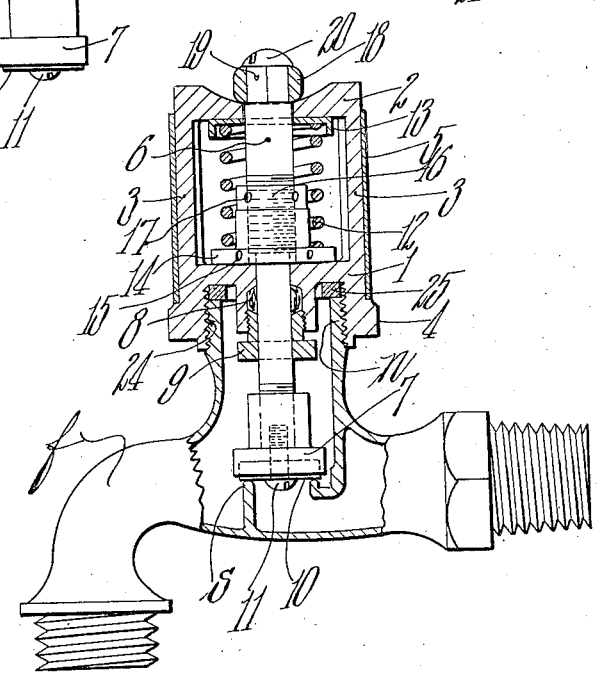
INVENTOR,
Michael J. Landers
BY
Chapin Neal
ATTORNEYS.

Patented Sept. 4, 1923.

1,467,004

UNITED STATES PATENT OFFICE.

MICHAEL J. LANDERS, OF CHICOPEE, MASSACHUSETTS.

RELIEF-VALVE ATTACHMENT FOR FAUCETS.

Application filed June 23, 1921. Serial No. 479,823.

*To all whom it may concern:*

Be it known that I, MICHAEL J. LANDERS, citizen of the United States, residing at Chicopee, in the county of Hampden and State of Massachusetts, have invented new and useful Improvements in Relief-Valve Attachments for Faucets, of which the following is a specification.

This invention relates to improvements in combined faucets and relief valves and, more particularly, to an improved valve unit which can be substituted for the ordinary valve unit of an existing faucet to make the latter function as a relief valve as well as a self-closing faucet.

The invention is especially suitable for use in connection with hot water systems, in which for the sake of safety a relief valve should be included to insure against danger resulting from excessive pressure therein. Local regulations frequently require such a relief valve and generally the relief valve has been combined with a delivery faucet, on the theory that the faucet, being opened frequently, will be kept reasonably free from clogging or corrosion such as might in time interfere with free working of the relief valve. The common practice is to substitute, as an entirely new unit, a combined faucet and relief valve for the old faucet, which practice is wasteful and results in unnecessary expense to the household by the discarding of the entire faucet body.

My invention has for its object to provide a unit containing a relief valve, with operating means therefor, which unit can be attached to an existing faucet body, after its valve element has been removed, by simply screwing it onto the faucet body in the same manner that the original valve element was applied.

Another object of the invention is to provide, in such a unit, a housing for the relief valve spring to completely enclose it and protect it from exposure to the water as well as from moisture, dust and dirt which may be present in the surrounding atmosphere.

A further object is to provide a unit of the character described which is of simple construction and relatively inexpensive to manufacture.

Other objects and advantages will appear in the following description and in the illustrative embodiment of the invention in the accompanying drawings, in which,—

Figs. 1 and 2 are elevational and plan views, respectively, of my improved relief valve unit; and Fig. 3 is a sectional elevational view of the unit mounted on an ordinary faucet body.

Referring to these drawings, the unit includes a supporting frame which comprises a base 1, a cap 2, and, preferably, at least two uprights 3, which connect the base and cap and are preferably formed integral therewith. The base and cap are of circular shape, except for the provision of a polygonal portion 4 on the lower portion of the base, which forms a nut for convenience in applying the unit to the faucet. Over these circular members is slipped a tube 5 of relatively thin metal which completely encloses the otherwise open space between the base and cap and forms a housing for the relief valve spring and other parts, as will later appear.

The valve mechanism includes a spindle 6 which is mounted in the base 2 and cap 1 so as to be free to turn as well as slide therein. The lower portion of spindle 6, which is of slightly less diameter than the upper portion, extends below base 1 to receive a valve element 7, and leakage between the spindle and base is prevented by a stuffing box arrangement, consisting of packing 8 in a recessed portion of the base and a gland 9 adjustably mounted on the base to compress such packing. The valve element 7 carries the usual washer 10 for engagement with the seat *s* of the ordinary faucet *f*. The element 7 is internally threaded to receive the threaded lower end of spindle 6, thereby permitting the element to be adjusted up or down on the spindle to suit the requirements of different faucets. The element 7 is locked in its various positions by a screw 11 which also holds the washer 10 in place. Screw 11 has a left-hand thread which enters an interiorly threaded portion of spindle 6 and, the exterior portion of the latter having a right-hand thread, it follows that screw 11 serves to lock the element 7 in place on spindle 6. Various other means may, however, be used for this purpose.

Encircling the upper portion of spindle 6 and disposed between base 1 and cap 2 is a spring 12, which acts between a spring seat 13 loosely fitting over the spindle and a spring seat 14 adjustably mounted on the latter, as by the screw-threads indicated in Fig. 3. The seat 13 is held by spring 13 in abutment with cap 2 and the seat 14 is provided with suitable means, as the holes 15, whereby it may be conveniently turned relatively to spindle 6, as with a spanner wrench, to effect the desired adjustment. A lock nut 16, having holes 17 for a similar purpose, is provided on spindle 6 to hold seat 14 in its various positions of adjustment.

The upper end of spindle 6 has suitably fixed thereto an operating handle 18. As shown, the handle 18 has a square hole therein to fit over the squared upper end 19 of spindle 6, and a screw 20 threaded into the latter holds the handle in place in the usual manner. Handle 18 has at least one, and preferably two, rounded cam follower portions 21 adapted for engagement with cams 22 fixed to, and preferably integral with, the cap 2. As shown, these cams are arranged in pairs so that no matter in which direction handle 18 is turned the follower portions 21 will engage cams 22 and lift spindle 6. Preferably, at the junction of each pair of cams 22, there is a flat surface 23, which may be engaged by the portions 21, when desired, to hold spindle 6 in lifted position. The inclination of cams 22 is such that the follower portions 21 will ride down upon them, whenever handle 18 is released, so that the valve may properly be termed "self-closing."

To apply the unit to an existing faucet body, as $f$, the valve spindle and cap are removed by merely unscrewing the latter and then lifting these assembled parts from the faucet body. The relief valve unit of this invention is then substituted for the parts thus removed and is applied by screwing the frame of the unit upon the threaded neck $n$ of faucet body $f$, the base 1 having an interiorly threaded portion 24 for this purpose. Preferably, packing, as 25, is applied as shown in Fig. 3, to insure a leakproof joint between these parts. It will thus be seen that the unit may be quickly and conveniently applied.

Moreover, the unit is adjustable not only for variation in the pressure at which valve element 7 will yield upwardly, but is also adjustable to fit faucet bodies in which the distance between the valve seat $s$ and the top of neck $n$ varies. For adjustment of the tension of spring 12, it is simply necessary to remove screw 20 and handle 18, whereupon housing 5 can be readily withdrawn from the frame and the nut 16 and seat 14 rendered accessible for adjustment.

The location of spring 12 outside the faucet is important for it need not then be made of special and expensive material to avoid corrosion. Furthermore, the spring is always readily and conveniently accessible for inspection and adjustment and yet it is also protected by the housing 5 from damage from various sources.

The unit is especially advantageous on account of its simplicity and the ease and low cost of manufacture. The frame is a simple casting requiring few machining operations and these are of a simple character. The spindle likewise is readily formed by simple operations. The housing 5, spring 12 and valve element 7 are stock parts readily obtainable in the market. The unit can therefore be supplied at relatively low cost and when applied to existing faucets, the total cost to the household is far less than when special combined faucets and relief valves are used and the original faucet discarded. Nevertheless, the unit, when applied to an existing faucet performs every desired function of the special combination faucets and relief valves heretofore used, i. e., it will relieve on excessive pressure and is adjustable to relieve at any pressure within reasonable limits; it functions as an ordinary delivery faucet; and it is better than the ordinary faucet in that it is quick-acting and self-closing.

The invention has been disclosed herein, in an embodiment at present preferred, for illustrative purposes, but the scope of the invention is defined by the appended claims rather than by the foregoing description.

What I claim is—

1. A relief valve attachment for faucets comprising, a frame having a base and cap held in spaced parallel relation by connecting means which expose the space between the base and cap, a valve spindle passing through and extending between said base and cap and slidable therein, a spring seat on said spindle, a spring surrounding the spindle and acting between the cap and said seat, a cam provided on said cap, and an operating handle engageable with said cam and rotatable with respect thereto, said handle being so engaged with said spindle as to lift and lower the latter when moved over said cam, said base having a part for attachment to a faucet body after the valve spindle and associated parts have been removed from said body.

2. A relief valve attachment for faucets, comprising, a frame having a base and cap held in spaced parallel relation by connecting means which expose the space between the base and cap, a housing fitting over the base and cap and enclosing the space therebetween, a valve spindle passing through and extending between said base and cap and slidable therein, a spring seat on said spindle, and a spring surrounding the spindle and acting between the cap and said seat, said base having a part for attachment to a faucet body after the valve spindle and associated parts have been removed from said body.

3. A relief valve attachment for faucets, comprising, a circular cap, a base having an interiorly threaded portion for attachment to the neck of a faucet body after the valve spindle and associated parts have been removed from said body and a polygonal portion on its exterior above which is a circular portion, and spaced uprights connecting the base and cap, a valve spindle extending through and between said base and cap, a spring seat thereon, a spring surrounding said spindle and acting between the cap and spring seat, a tube fitting over the circular portions of the base and cap to enclose the space therebetween and held against longitudinal movement in one direction by said polygonal portion, a cam on the upper face of the cap, and an operating handle engaging the spindle above the cap and having a part for engagement with the cam, said handle preventing removal of said tube in the opposite direction.

4. A relief valve attachment for faucets, comprising, a base having an interiorly threaded portion for attachment to a faucet body after the valve spindle and associated parts have been removed from said body and within such portion a centrally located stuffing box, a cap, and spaced parts connecting the base and cap, a valve spindle extending through, between, and beyond the base and cap and through said stuffing box, a spring seat on said spindle above the base, a spring acting between the latter and the lower face of the cap, a handle engaging the spindle above the cap, and a cam on the upper face of the latter for engagement with said handle.

In testimony whereof I have affixed my signature.

MICHAEL J. LANDERS.